United States Patent [19]

Bales et al.

[11] Patent Number: 5,614,599
[45] Date of Patent: Mar. 25, 1997

[54] STILBENE-BASED POLYESTER AND POLYCARBONATE COMPOSITIONS

[75] Inventors: Stephen E. Bales, Midland, Mich.; Robert E. Hefner, Jr., Lake Jackson, Tex.; Rina Singh, Midland, Mich.

[73] Assignee: The Dow Chemical Company, Midland, Mich.

[21] Appl. No.: 542,489

[22] Filed: Oct. 13, 1995

Related U.S. Application Data

[63] Continuation-in-part of Ser. No. 331,779, Oct. 31, 1994, abandoned.

[51] Int. Cl.$^6$ .................................................. C08F 283/00
[52] U.S. Cl. ..................... 525/461; 264/176.1; 525/63; 525/437; 528/190; 528/193; 528/194; 528/196
[58] Field of Search ........................... 264/176.1; 525/63, 525/437, 461; 528/193, 194, 196, 190

[56] References Cited

U.S. PATENT DOCUMENTS

| | | |
|---|---|---|
| 2,970,137 | 1/1961 | Whitlock . |
| 2,999,846 | 9/1961 | Schnell et al. . |
| 3,028,365 | 4/1962 | Schnell et al. . |
| 3,153,008 | 10/1964 | Fox et al. . |
| 3,169,121 | 2/1965 | Goldberg . |
| 3,187,065 | 6/1965 | McPherson et al. . |
| 3,215,668 | 11/1965 | Bissinger et al. . |
| 3,248,414 | 4/1966 | Stevens . |
| 4,105,633 | 8/1978 | Swart et al. . |
| 4,107,143 | 8/1978 | Inata et al. . |
| 4,156,069 | 5/1979 | Prevorsek . |
| 4,194,038 | 3/1980 | Baker et al. . |
| 4,238,596 | 12/1980 | Quinn . |
| 4,238,597 | 12/1980 | Markezich . |
| 4,252,939 | 2/1981 | Mori et al. . |
| 4,255,556 | 3/1981 | Segal et al. . |
| 4,260,731 | 3/1981 | Mori et al. . |
| 4,330,662 | 5/1982 | Bales et al. . |
| 4,355,150 | 10/1982 | Bosnyak et al. . |
| 4,360,656 | 11/1982 | Swart et al. . |
| 4,369,303 | 1/1983 | Mori et al. . |
| 4,371,660 | 2/1983 | Calundann et al. . |
| 4,374,973 | 2/1983 | Prevorsek et al. . |
| 4,388,455 | 6/1983 | Bales . |
| 4,398,018 | 8/1983 | Akkapeddi et al. . |
| 4,543,313 | 9/1983 | Mahabadi et al. . |
| 4,654,412 | 3/1987 | Calundann et al. ............ 428/176 |
| 4,831,105 | 5/1989 | Schissel . |
| 4,886,869 | 12/1989 | Pielartzik et al. . |

(List continued on next page.)

OTHER PUBLICATIONS

*Encyclopedia of Polymer Science and Engineering*, Supplement vol. 1, pp. 444–467.
*Encyclopedia of Polymer Science and Engineering*, vol. 11, pp. 62–128.
*Encyclopedia of Polymer Science and Engineering*, (2nd ed.), vol. 9, pp. 1–61 (1988).
*Encyclopedia of Polymer Science and Engineering*, (2nd ed.), vol. 11, pp. 648–718 (1988).
*Encyclopedia of Polymer Science and Engineering*, (2nd ed.), vol. 12, pp. 1–75 (1988).
Bluhm et al., *Mol. Cryst. Liq. Cryst.*, vol. 239, pp. 123–140 (1994).
Blumstein et al., *Mol Cryst. Liq. Cryst.*, vol. 49, pp. 255–258 (1979).
Blumstein, Alexandre, *Polym. Journal*, vol. 17, pp. 277–288 (1985).
Bubeck, R. et al., *Polym. Eng. Sci.*, vol. 24, pp. 1142–1148 (1984).
Cebe et al., *Polym. Preprints*, vol. 33, pp. 331–332 (1992).
Cheng, Yao–Yi et al., *Macromolecules*, vol. 27, pp. 5440–5448 (1992).
54699m, Kolesnikov et al., *Vysokomol Soedin*, A 9(5), vol. 67, pp. 1012–1015 (1967). (Abstract).
Kolesnikov et al., *Vysokmol Soyed*, A9: No. 7, pp. 1520–1524 (1967)—Translation pp. 1705–1711.
27945y, Kolesnikov et al., *Vysokmol Soedin*, B9, pp. 49 (1967). (Abstract).
McMurry et al., *J. Org. Chem.*, vol. 40, No. 18, pp. 2687–2688 (1975).
Percec, Virgil et al., *J. Polym. Sci. Polym. Let. Ed.*, vol. 22, pp. 637–647 (1984).
Percec, Virgil et al., *J. Polym. Sci. Polym. Let.*, vol. 25, pp. 405–431 (1987).
Percec, V. et al., *Mol. Cryst. Liq. Cryst.*, vol. 205, pp. 47–66 (1991).
Roviello, Antonio et al., *Makromol. Chem.*, vol. 180, pp. 2543–2545 (1979).
Roviello, Antonio et al., *Makromol. Chem.*, vol. 183, pp. 409–415 (1982).
Roviello, Antonio et al., *Makromol. Chem.*, vol. 183, pp. 895–904 (1982).
Sato, M., *J. Polym. Sci.: Part A: Polym. Chem.*, vol. 26, pp. 2613–2617 (1988).
27945y, Samsoniya et al., *Vysokomol. Soedin.*, Ser. B (1968) 10(5), pp. 344–347. (Abstract).
Sun, Shih–Jien et al., *J. Polym. Sci.*, Part A: Polym. Chem., vol. 31, pp. 2711–2719 (1993).
Zeheer, S. H. et al., *J. Chem. Soc.*, pp. 3360–3362 (1954).
VanKrevelen, *Properties of Polymers*, Chapter 26, pp. 725–744 (1990).

*Primary Examiner*—Terressa Mosley
*Attorney, Agent, or Firm*—Ann K. Galbraith

[57] ABSTRACT

Described is a polycarbonate, polyester, or polyestercarbonate composition prepared from a reaction mixture comprising at least one diol and at least one carbonate precursor or ester precursor, wherein at least about 95 mole percent of the diol present in the reaction mixture consists of one or more aromatic diols, at least about 10 mole percent of which consists of one or more stilbene diols. The composition of the invention advantageously has a relatively high thermal resistance, melting temperature, tensile and flexural properties, and/or resistance to thermal embrittlement. Moreover, the polymers of the invention which are thermotropic liquid crystalline also advantageously possess a broad temperature range for liquid crystallinity, good melt processability, a low coefficient of thermal expansion, a high ignition resistance, high solvent resistance, and/or good barrier properties.

23 Claims, No Drawings

U.S. PATENT DOCUMENTS

| | | |
|---|---|---|
| 4,945,150 | 7/1990 | Marshall et al. . |
| 4,946,926 | 8/1990 | Marshall et al. . |
| 4,962,163 | 10/1990 | Hefner, Jr. et al. . |
| 4,985,532 | 1/1991 | Pakull et al. . |
| 4,987,208 | 1/1991 | An et al. . |
| 5,034,496 | 7/1991 | Bales et al. . |
| 5,037,938 | 8/1991 | Brewbaker et al. . |
| 5,045,610 | 9/1991 | Bales et al. . |
| 5,066,750 | 11/1991 | Hefner, Jr. et al. . |
| 5,071,942 | 12/1991 | Brewbaker et al. . |
| 5,110,896 | 5/1992 | Waggoner et al. . |
| 5,138,021 | 8/1992 | Judas et al. . |
| 5,142,018 | 8/1992 | Sakashita . |
| 5,164,464 | 11/1992 | Hefner, Jr. et al. . |
| 5,175,237 | 12/1992 | Jones . |
| 5,175,326 | 12/1992 | Klabunde . |
| 5,185,097 | 2/1993 | Toshida et al. . |
| 5,218,062 | 6/1993 | Earls et al. . |
| 5,221,730 | 6/1993 | Morris et al. . |
| 5,227,452 | 7/1993 | Earls et al. . |
| 5,233,013 | 8/1993 | Parodi et al. . |
| 5,237,038 | 8/1993 | Morris et al. . |
| 5,248,360 | 9/1993 | Jones, Jr. et al. . |
| 5,262,473 | 11/1993 | Cottis et al. . |
| 5,266,660 | 11/1993 | Hefner, Jr. et al. . |
| 5,266,661 | 11/1993 | Earls et al. . |
| 5,268,443 | 12/1993 | Brewbaker et al. . |
| 5,270,404 | 12/1993 | Earls et al. . |
| 5,270,405 | 12/1993 | Earls et al. . |
| 5,270,406 | 12/1993 | Earls et al. . |
| 5,276,184 | 1/1994 | Hefner, Jr. et al. . |
| 5,292,831 | 3/1994 | Earls et al. . |
| 5,302,689 | 4/1994 | Tsai . |

STILBENE-BASED POLYESTER AND POLYCARBONATE COMPOSITIONS

CROSS-REFERENCE TO RELATED APPLICATION

This application is a continuation-in-part of application U.S. Ser. No. 08/331,779, filed Oct. 31, 1994, abandoned which is hereby incorporated by reference in its entirety.

BACKGROUND OF THE INVENTION

This invention relates to polycarbonates, polyesters, and polyestercarbonates prepared from at least one aromatic diol, wherein a portion or all of the aromatic diol used in their preparation is a stilbene diol.

Certain polymers derived from stilbene diols are known and are described, for example, in Cebe et al., *Polym. Preprints*, Vol. 33, p. 331 (1992), Bluhm et al., *Mol. Cryst. Liq. Cryst.*, Vol. 239, p. 123 (1994), and Cheng et al., *Macromolecules*, Vol. 27, p. 5440 (1994), which describe the preparation of mixed aromatic-aliphatic polycarbonates based on stilbene diols and $C_{4-12}$ alpha,omega-alkanediols. Percec et al., *J. Polym. Sci. Polym. Lett.*, Vol. 22, p. 637 (1984) and *J. Polym. Sci. Part A: Polym. Chem.*, Vol. 25, p. 405 (1987) report the synthesis of mixed aromatic-aliphatic polyethers via the reaction of 4,4'-dihydroxy-alpha-methylstilbene with $C_{1-11}$ alpha,omega-dibromoalkanes. Blumstein et al., *Mol. Cryst. Liq. Cryst.*, Vol. 49, p. 255 (1979) and *Polym. Journal*, Vol. 17, p. 277 (1985) describe mixed aromatic-aliphatic polyesters from stilbene diols and alpha, omega-alkanedicarboxylic acids. Roviello and Sirigu, *Makromol. Chem.*, Vol. 180, p. 2543 (1979), *Makromol. Chem.*, Vol. 183, p. 409 (1982) and *Makromol. Chem.*, Vol. 183, p. 895 (1982) report the preparation of mixed aromatic-aliphatic thermotropic liquid crystalline polyesters from 4,4'-dihydroxy-alpha-methylstilbene and $C_{8-14}$ alpha,omega-alkanedicarboxylic acids. Sato, J., *Polym. Sci.: Part A: Polym. Chem.*, Vol. 26, p. 2613 (1988) reports the synthesis of mixed aromatic-aliphatic polyesters using 4,4'-dihydroxy-alpha,alpha'-diethylstilbene and adipoyl chloride, sebacoyl chloride, and mixtures of adipoyl and sebacoyl chlorides. However, the physical properties and melt characteristics of such polymers may be less than desirable for certain applications.

SUMMARY OF THE INVENTION

In one aspect, this invention is a polycarbonate, polyester, or polyestercarbonate composition prepared from a reaction mixture comprising at least one diol and at least one carbonate precursor or ester precursor, wherein (a) at least about 95 mole percent of the carbonate precursor or ester precursor present in the reaction mixture is selected from the group consisting of (i) dialkyl carbonates, diarylcarbonates, carbonyl halides, and bis(trihlaoalkyl) carbonates;

(ii) aromatic dicarboxylic acids, hydroxybenzoic acids, hydroxynapthoic acids, hydroxybiphenyl acids, hydroxycinnamic acids, and the halides or metal salts of such acids; and (iii) oligomers and polymers of (i) or (ii) containing carbonate or ester groups, which are prepared by contacting an excess over stoichiometry of at least one compound selected from (i) or (ii) with at least one monol or diol under reaction conditions sufficient to form the corresponding oligomer or polymer; and (b) at least about 95 mole percent of the diol present in the reaction mixture consists of one or more aromatic diols, at least about 10 mole percent of which consists of one or more stilbene diols.

Applicants have discovered that the composition of the invention has an advantageous thermal resistance, melting temperature, tensile and flexural properties, and/or resistance to thermal embrittlement. Moreover, those polymers of the invention which are thermotropic liquid crystalline also have an advantageous temperature range for liquid crystallinity, melt processability, coefficient of thermal expansion, ignition resistance, solvent resistance, and/or barrier properties. These and other advantages of the invention will be apparent from the description which follows.

DETAILED DESCRIPTION OF THE INVENTION

The polymeric composition of the invention may be prepared by any method suitable for the preparation of polycarbonate, polyester, or polyestercarbonate polymers, so long as at least about 95 mole percent of the diol present in the polymerization reaction mixture consists of one or more aromatic diols, and at least about 10 mole percent of the aromatic diols consists of one or more stilbene diols. Such methods include interfacial, solution, and melt polymerization processes. Further, the polymeric composition of the invention may be prepared as a homopolymer, or as a random or block copolymer of the various monomers described below. The term "reaction mixture" as used herein refers to the mixture of monomers which are polymerized to form the composition of the invention, utilizing any of the polymerization methods described in any of the references cited herein.

The composition of the invention preferably comprises repeating units of the formulas:

$$—R—O—X—O— \qquad (I)$$

and optionally

$$—R^2—C(O)—O— \qquad (II)$$

wherein R independently in each occurrence is the divalent nucleus of an aromatic diol, X is selected from: —C(O)—, —C(O)—$R^1$—C(O)—, or a mixture thereof, $R^1$ independently in each occurrence is the divalent nucleus of a difunctional aromatic carboxylic acid, and $R^2$ is the divalent nucleus of an aromatic hydroxy carboxylic acid. As indicated by the above formulas, other monomers such as hydroxy carboxylic acids may also be present in the polymerization reaction mixture, in addition to the diols and carbonate precursors. The term "divalent nucleus" as used herein refers to the compound described, minus its pendant hydroxyl and/or carboxyl groups.

When the polymeric composition of the invention is a polycarbonate, it may be prepared by the reaction of an aromatic diol or mixtures of aromatic diols with a carbonate precursor. The term "carbonate precursor" as used herein refers to carbonyl halides, diaryl carbonates, dialkyl carbonates, bis(trihaloalkyl)carbonates such as triphosgene, bishaloformates, and other compounds which will react with hydroxyl groups to form carbonate linkages (—O—C(O)—O—). Examples of suitable carbonyl halides include carbonyl bromide, carbonyl chloride ("phosgene") and mixtures thereof. Suitable haloformates include the bischloroformates of dihydric phenols such as bisphenol A. Preferably, the carbonate precursor is phosgene or diphenyl carbonate, and is most preferably diphenyl carbonate. Examples of suitable methods for preparing polycarbonates are set forth in "Polycarbonates," *Encyclopedia of Polymer Science and Engineering* (2nd Edition), Vol. 11, pp. 648–718 (1988); U.S. Pat. Nos. 5,142,018; 5,034,496; 4,831,105; 4,543,313; 3,248,414; 3,153,008; 3,215,668; 3,187,065; 3,028,365; 2,999,846; 2,999,835; 2,970,137; 2,964,974; and 1,991,273; all of which are incorporated herein by reference.

When the polymeric composition of the invention is a polyester, it may be prepared by the reaction of an aromatic diol or a reactive derivative thereof (such as the corresponding diacetate), with an ester precursor The term "ester precursor" as used herein refers to $C_{8-40}$ dicarboxylic acids or reactive derivatives thereof (such as esters thereof or the corresponding acid halides), which will react with hydroxyl groups to form ester linkages (—O—C(O)—$R^1$—C(O)—O—, wherein $R^1$ is the divalent nucleus of the ester precursor). Preferably, the ester precursor is an aromatic dicarboxylic acid.

A portion of the ester component in these polymeric compositions may optionally be derived from hydroxycarboxylic acids or reactive derivatives thereof, either by reaction with the other monomers or self-condensation, to provide repeat units of the formula (II): —[$R^2$—C(O)—O]—, wherein $R^2$ is the divalent nucleus of a hydroxycarboxylic acid. Examples of suitable methods for preparing polyesters are set forth in "Polyesters," *Encyclopedia of Polymer Science and Engineering* (2nd Edition), Vol. 12, pp. 1–75 (1988); "Liquid Crystalline Polymers," *Encyclopedia of Polymer Science and Engineering* (2nd Edition), Vol. 9, pp. 1–61 (1988); "Polyesters, Mainchain Aromatic," *Encyclopedia of Polymer Science and Engineering* (2nd Edition), Vol. I, pp. 262–279; U.S. Pat. Nos. 5,268,443; 5,237,038; 5,233,013; 5,221,730; 5,175,237; 5,175,326; 5,110,896; 5,071,942; 5,037,938; 4,987,208; 4,946,926; 4,945,150; and 4,985,532; all of which are incorporated herein by reference.

Similarly, when the polymeric composition of the invention is a polyestercarbonate, it may be prepared by the reaction of an aromatic diol with a combination of a carbonate precursor and an ester precursor as described above. Suitable methods for the preparation of polyestercarbonates are described in U.S. Pat. Nos 5,045,610; 4,398,018; 4,388,455; 4,374,973; 4,371,660; 4,369,303; 4,360,656; 4,355,150; 4,330,662; 4,287,787; 4,260,731; 4,255,556; 4,252,939; 4,238,597; 4,238,596; 4,194,038; 4,156,069; 4,107,143; 4,105,633; and 3,169,121; and articles by Kolesnikov et al. published in *Vysokomol Soedin* as B9, p. 49 (1967); A9, p. 1012 (1967); A9, p. 1520 (1967); and A10, p. 145 (1968); all of which are incorporated herein by reference.

In the preparation of the composition of the invention, at least about 95 mole percent of the carbonate precursor or ester precursor present in the reaction mixture is selected from the group consisting of (i) dialkyl carbonates, diarylcarbonates, carbonyl halides, and bis(trihlaoalkyl) carbonates;

(ii) aromatic dicarboxylic acids, hydroxybenzoic acids, hydroxynapthoic acids, hydroxybiphenyl acids, hydroxycinnamic acids, and the halides or metal salts of such acids; and (iii) oligomers and polymers of (i) or (ii) containing carbonate or ester groups, which are prepared by contacting an excess over stoichiometry of at least one compound selected from (i) or (ii) with at least one monol or diol under reaction conditions sufficient to form the corresponding oligomer or polymer. The term "oligomer" as used herein includes monoesters, diesters, monocarbonates, and dicarbonates of the monol or diol.

Suitable stilbene diols for use in the preparation of the polymeric composition of the invention include those of the formula:

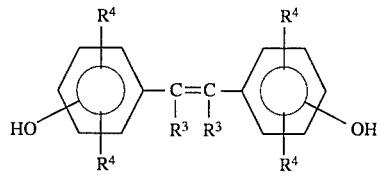

wherein $R^3$ independently in each occurrence is selected from the group consisting of hydrogen, $C_{1-8}$ alkyl, chlorine, bromine, and cyano, but is preferably hydrogen or $C_{1-8}$ alkyl; $R^4$ independently in each occurrence is selected from the group consisting of hydrogen, halogen, alkyl, aryl, alkoxy, aryloxy, cyano, nitro, carboxamide, carboximide, and $R^5$—C(O)—, wherein $R^5$ is $C_{1-8}$ alkyl or aryloxy, but is preferably hydrogen or $C_{1-8}$ alkyl. Preferably, the phenolic groups are in a "trans" configuration about the double bond. Preferably, the stilbene diol is 4,4'-dihydroxystilbene; 4,4'-dihydroxy-alpha-methylstilbene; 4,4'-dihydroxy-alpha,alpha'-dimethylstilbene; or 4,4'-dihydroxy-alpha,alpha'-diethylstilbene.

The stilbene diols described above may be prepared by any suitable method. For example, the diol is prepared from a phenol and a carbonyl-containing precursor, using any of the procedures described by S. M. Zaher et al., Part 3, *J. Chem. Soc.*, pp. 3360–3362 (1954); V. Percec et al., *Mol. Cryst. Liq. Cryst.*, Vol. 205, pp. 47–66 (1991); Singh et al., *J. Chem. Soc.*, p. 3360 (1954), or Hefner et al., U.S. Pat. No. 5,414,150. If desired, color bodies, or color forming bodies, may be removed from the stilbene diols by contacting them with an aqueous solution of one or more compounds selected from the group consisting of alkali metal carbonates, alkali earth metal carbonates, alkali metal bicarbonates (such as sodium bicarbonate), or alkaline earth metal carbonates. The stilbene diol(s) used to prepare the composition of the invention preferably have a 4,4' isomeric purity of at least about 95 mole percent, more preferably at least about 98 mole percent and most preferably at least about 99 mole percent.

In addition to the stilbene diol, one or more additional aromatic diols may also be used to prepare the composition of the invention. Suitable aromatic diols include any aromatic diol which will react with a carbonate precursor or ester precursor. Preferred diols include 2,2-bis(4-hydroxyphenyl)propane ("bisphenol A"); 9,9-bis(4-hydroxyphenyl)fluorene; hydroquinone; resorcinol; 4,4'-dihydroxybiphenyl; 4,4'-thiodiphenol; 4,4'-oxydiphenol; 4,4'-sulfonyldiphenol; 4,4'-dihydroxybenzophenone; 4,4''-dihydroxyterphenyl; 1,4-dihydroxynaphthalene; 1,5-dihydroxynaphthalene; 2,6-dihydroxynaphthalene; bis(4-hydroxyphenyl)methane ("bisphenol F"); and inertly substituted derivatives thereof, as well as mixtures thereof. Preferably, the diol is 2,2-bis(4-hydroxyphenyl)propane ("bisphenol A").

In the preparation of the composition of the invention, at least about 95 mole percent of the diols present in the reaction mixture consist of one or more aromatic diols. Preferably, at least about 98 mole percent, and more preferably 100 mole percent of such diols are aromatic diols. Further, at least about 10 mole percent of the aromatic diol present in the reaction mixture consists of one or more stilbene diols. Preferably, at least about 25 mole percent, and more preferably at least about 50 mole percent of such aromatic diols are stilbene diols.

Examples of aromatic dicarboxylic acids which may be used to prepare polyester or polyestercarbonate compositions of the invention include terephthalic acid; isophthalic acid; 2,6-naphthalenedicarboxylic acid; 1,4-naphthalenedicarboxylic acid; 1,5-naphthalenedicarboxylic acid; 4,4'-biphenyldicarboxylic acid; 3,4'-biphenyldicarboxylic acid; 4,4''-terphenyldicarboxylic acid; 4,4'-stilbenedicarboxylic acid; 4,4'-dicarboxy-alpha-methylstilbene; inertly substituted derivatives thereof, as well as mixtures thereof.

Examples of hydroxycarboxylic acids that may be used to prepare the polyester and polyestercarbonate polymeric compositions of the present invention include 4-hydroxybenzoic acid; 3-hydroxybenzoic acid; 6-hydroxy-2-naphthoic acid; 7-hydroxy-2-naphthoic acid; 5-hydroxy-1-naphthoic acid; 4-hydroxy-1-naphthoic acid; 4-hydroxy-4'-biphenylcarboxylic acid; 4-hydroxy-4'-carboxydiphenyl ether; 4-hydroxycinnamic acid; inertly substituted derivatives thereof, as well as mixtures thereof.

Processes for the preparation of polycarbonates, polyesters, and polyestercarbonates typically employ a chain stopping agent during the polymerization step to control molecular weight. The amount of chain stopping agent has a direct effect on both the molecular weight and the viscosity of the polycarbonate, polyester, or polyestercarbonate prepared. Chain stopping agents are monofunctional compounds which react with a carbonate or ester precursor site on the end of the polymer chain and stop the propagation of the polymer chain. Examples of suitable chain stopping agents include monofunctional aromatic alcohols, thiols, and amines, as well as mixtures thereof. Preferably, the chain stopping agent is a monofunctional aromatic alcohol, thiol, amine, aliphatic alcohol, aromatic carboxylic acid, aliphatic carboxylic acid, or a mixture thereof.

The compositions of the present invention are preferably of the following formula:

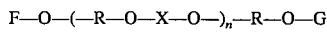

F—O—(—R—O—X—O—)$_n$—R—O—G and optionally contain repeat units of the formula (II): (—R$^2$—C(O)—O—)$_n$; and/or end groups of the formulas:

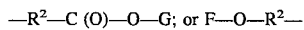

—R$^2$—C(O)—O—G; or F—O—R$^2$— wherein R, X, R$^1$ and R$^2$ have the descriptions hereinbefore provided; n is a whole number from about 5 to about 300; and F and G are, independently, either hydrogen or other terminating groups common to polycarbonates, polyesters carbonates, or polyesters. Preferably, F and G are represented by the formulas:

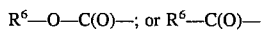

R$^6$—O—C(O)—; or R$^6$—C(O)— wherein R$^6$ is hydrogen, halogen, or the nucleus of an alkyl, aryl, or alkylsubstituted aryl alcohol or carboxylic acid.

The polymers of the present invention preferably have a weight average molecular weight (Mw, determined by size exclusion chromatography using a bisphenol A polycarbonate calibration curve) of at least about 10,000, more preferably at least about 20,000. Preferred polymers according to the present invention have inherent viscosities, measured in methylene chloride (for an amorphous polymer) at 0.5 grams per deciliter (g/dL) and 25° C., or in pentafluorophenol (for a crystalline or liquid crystalline polymer) at 0.1 g/dL and 45° C., of at least 0.2 dL/g and more preferably at least 0.35 dL/g.

Liquid crystalline polymeric compositions may be identified using one or more standard techniques, such as heating the composition on a differential scanning calorimeter and characterizing it in the melt state by optical microscopy under cross-polarized light. Thermotropic liquid crystalline polymers will exhibit optical anisotropy upon melting. Other techniques which may be used to characterize the polymer as liquid crystalline include scanning electron microscopy, X-ray diffraction, visible light scattering techniques, electron beam diffraction, infrared spectroscopy, and nuclear magnetic resonance. If the composition is liquid crystalline, it preferably has nematic ordering in the liquid crystalline melt state.

As mentioned above, the compositions of the invention advantageously have a relatively high thermal resistance, melting temperature, tensile and flexural properties, and/or resistance to thermal embrittlement. Moreover, those polymers of the invention which are thermotropic liquid crystalline also advantageously possess a broad temperature range for liquid crystallinity, good melt processability, a low coefficient of thermal expansion, a high ignition resistance, high solvent resistance, and/or good barrier properties. The thermal resistance of the composition may be characterized by its Vicat softening temperature and the temperature at which it may be distorted under load, as illustrated in Example 2. The tensile and flexural properties of the composition may be characterized and measured in accordance with ASTM D-638, as illustrated in the Examples below. The composition's resistance to thermal embrittlement refers to its tendency to become brittle at elevated temperature, and may be characterized by measurement of its post yield stress drop, as illustrated in Example 7.

The composition of the invention, when thermotropic liquid crystalline, also preferably has thermal characteristics which permit it to be readily processed in the liquid crystal state when heated above its melt temperature. The temperature range over which such polymers may be processed above their melt temperature in the liquid crystal state is preferably as broad as possible, but is preferably at least about 25° C., more preferably at least about 50° C., and is most preferably at least about 100° C. In most instances, the composition will become isotropic above this range, in which case the range may be expressed as the difference between the clearing temperature (T$_{cl}$) and the melt temperature (T$_m$) of the composition. The clearing temperature is the temperature at which the composition undergoes a transition from the anisotropic liquid crystalline state to an isotropic state (see, e.g., *The Encyclopedia of Polymer Science and Engineering*, Vol. 9, p. 55 (1988).

The melt processability of the polymeric composition may be characterized by its melt temperature and its melt viscosity, as illustrated in the Examples below. The melt temperature of the composition (T$_m$, as determined by Differential Scanning Calorimetry) when thermotropic liquid crystalline, is preferably at least about 200° C., more preferably at least about 250° C., but is preferably no greater than about 350° C.

The coefficient of thermal expansion of the composition of the invention may be measured in accordance with ASTM D-2236, as illustrated in the Examples below. The ignition resistance of the polymers may be measured by determining the Limiting Oxygen Index of the composition, by testing the composition in accordance with Underwriters Laboratories' test number UL-94, or by measuring the char yield of the composition by thermal gravimetric analysis. The solvent resistance of the composition of the invention may be characterized as shown in the Examples below.

The barrier properties of the composition of the invention may be measured in accordance with ASTM D-3985 (oxygen transmission rate) and ASTM F-372 (carbon dioxide and water vapor transmission rate).

The composition of the invention may be subjected to post-condensation in the solid phase (also known as solid-state advancement), preferably under reduced pressure, at a temperature in the range from 150°–350° C. After about 1 to 24 hours, the molecular weight has increased and the resulting polymers exhibit further improved properties. The composition of the present invention may be fabricated using any of the known thermoplastic molding procedures, including compression molding, injection molding, and extrusion to provide fabricated articles, including moldings, boards, sheets, tubes, fibers, and films. Procedures that may be employed to maximize the orientation of the liquid crystal moieties contained in fabricated articles from the polymers of the invention are summarized in U.S. Pat. No. 5,300,594, as well as the references cited therein, all of which are hereby incorporated by reference.

The composition of the present invention can also be employed with other thermoplastic polymers to prepare thermoplastic polymer blends. Suitable thermoplastics for this purpose include polycarbonates, polyesters, polyethers, polyetherketones, polysulfides, polysulfones, polyamides, polyurethanes, polyimides, polyalkylenes such as polyethylenes and polypropylenes, polystyrenes, copolymers thereof and mixtures thereof. The polymers of this invention may, in addition to being used for molding purposes, be employed as the base for preparing thermoplastic molding compositions by being compounded with antioxidants, antistatic agents, inert fillers and reinforcing agents such as glass fibers, carbon fibers, talc, mica, and clay, hydrolytic stabilizers, colorants, thermal stabilizers, flame retardants, mold release agents, plasticizers, UV radiation absorbers, and nucleating agents as described in U.S. Pat. Nos. 4,945,150 and 5,045,610 and the other references cited above.

ILLUSTRATIVE EMBODIMENTS

The following examples are given to illustrate the invention and should not be interpreted as limiting it in any way. Unless stated otherwise, all parts and percentages are given by weight.

EXAMPLE 1

Preparation of Polycarbonate of 4,4'-Dihydroxy-alpha-methylstilbene (DHAMS)

The polymerization is run in a 1 L single-neck round bottom flask fitted with a two-neck adapter upon which are mounted a glass paddle stirrer and a 13 centimeter (cm) Vigreaux distillation column, distillation head with a thermometer, condenser and a receiver. DHAMS (1.79 mol, 403.6 g) and diphenylcarbonate (1.93 mol, 412.7 g) are added to the reaction flask. The apparatus is evacuated and refilled with nitrogen three times. The flask is immersed in a molten salt bath preheated to 220° C. When the solid reactants have melted to form a molten reaction mass, stirring is started and an aqueous solution of lithium hydroxide (0.82 mL, 0.06M) is added as a catalyst. The reaction temperature is raised to 290° C. over a period of 1 hour and the pressure is reduced from atmospheric pressure to $2 \times 10^{-3}$ atmospheres. The latter pressure is maintained for one hour at 290° C. After an additional 5 minutes the reaction mass forms a ball on the stirrer shaft. The vacuum is then released under nitrogen and the reaction vessel is removed from the salt bath. The reaction apparatus is cooled and disassembled. The distillation receiver contained 337 g of phenol. The flask is broken away from the opaque chalk-white polycarbonate plug. The plug is sawed into chunks and then ground in a Wiley mill. The product is dried in a vacuum oven at 100° C. for 2 hours to give 408 g of product (91% yield).

The polycarbonate has an inherent viscosity (IV) of 2.6 dL/g, measured at 45° C. using a solution of 0.1 g of polycarbonate in 100 mL of pentafluorophenol. Differential scanning calorimetry (DSC), conducted at 20° C./min using a Du Pont Instruments DSC 2910, shows a peak melting point of 273° C. (first heating scan, run from 25° to 320° C.) and a crystallization temperature of 202° C. (first cooling scan, run from 320° to 50° C.). A second heating scan shows a peak endotherm at 272° C., and a second cooling scan shows a crystallization temperature at 194° C. When the initial heating scan is run from 25° to 400° C., a second endotherm is observed at 375° C. Examination by hot stage cross-polarized microscopy (described hereinafter) indicates that the first endotherm is a solid crystalline to nematic liquid crystalline transition, and the second endotherm is a nematic liquid crystalline to isotropic liquid clearing transition.

The $^1$H NMR and $^{13}$C NMR spectra of the DHAMS polycarbonate are determined in pentaflurophenol at 45° C. The $^1$H NMR (300 MHz) spectrum of the homopolycarbonate shows the presence of aliphatic, aromatic and vinylic hydrogen atoms. The infrared spectrum shows the presence of C=O, C=C, and C—O groups. Apparent molecular weights are determined by gel permeation chromatography (GPC) using refractive index detection. Calibration is done using both BA (BA) polycarbonate and narrow molecular weight distribution polystyrene, with chloroform as the mobile phase. Sample preparation is done by dissolution of 40 mg sample in 1 mL pentafluorophenol at 45° C. followed by addition of 10 mL chloroform. Using BA polycarbonate for calibration, the DHAMS polycarbonate sample has $M_w$=66,000 and $M_n$=13,000. Using polystyrene as the calibration, the DHAMS polycarbonate has $M_w$=154,000 and $M_n$=20,000.

Characterization by Optical Microscopy Under Crosspolarized Light

The apparatus used for determining optical anisotropy includes a THM 600 hot stage (Linkham Scientific Instruments LTD, Surrey, England) and a Nikon Optiphot Microscope equipped with crossed polarizers and a 35 mm camera (Nikon Instrument Group, Nikon, Inc., Garden City, N.Y.). Observation of a bright field at temperatures above the melting point indicates that the DHAMS polycarbonate melt is optically anisotropic. The sample is placed on the programmable hot stage and a heating rate of 50° C./min is used initially from 25° to 180° C., then 10° C./min is used from 180° to 250° C. and then 5° C./min is used from 250° C. to 300° C. Observation of the samples shows a nematic phase at room temperature and a nematic phase upon melting. The polymer forms a turbid melt that shows strong shear opalescence. The following observations are made for this DHAMS polycarbonate sample, using the polarizing microscope.

| Temperature (°C.) | Observations |
| --- | --- |
| 25 | white opaque solid |
| 150 | white opaque solid |

-continued

| Temperature (°C.) | Observations |
| --- | --- |
| 180 | compressed between coverslip and slide |
| 260 | highly birefringent, nematic texture, viscous fluid |
| 290 | highly birefringent, nematic texture, flow directed domains |
| 300 | anisotropic melt, still passes crosspolarized light |

The sample remains anistropic above 300° C., indicating that DHAMS polycarbonate is liquid crystalline. Clearing (transition from liquid crystalline to isotropic phase) is not observed until about 370° C.

Solubility Characterization

The thermotropic liquid crystalline DHAMS polycarbonate prepared in this example is insoluble in conventional organic solvents both at room temperature and elevated temperatures. Solvents that do not dissolve this polycarbonate include methylene chloride, chloroform, carbon tetrachloride, tetrahydrofuran, acetone, N,N-dimethylacetamide, dimethylsulfoxide, pyridine, and trifluoroacetic acid/methylene chloride (4/1 volume ratio). The polycarbonate is soluble in pentafluorophenol at high dilutions (0.1 g/dL).

Melt Viscosity Determination

The melt viscosity of the DHAMS polycarbonate sample is determined using an Instron 3211 capillary rheometer with capillary length of 1.0087 inch, capillary diameter of 0.05005 inch, a shear rate range of 3.5 to 350 $sec^{-1}$, and a temperature of 290° C. The samples for the rheometer are prepared by placing a predried, (100° C. vacuum oven dried) polymer sample (1 g) in a stainless steel die, pressing in a hydraulic press at a platen pressure of about 3,000 pounds for a few minutes and obtaining cylindrical pellets. The melt viscosity of DHAMS polycarbonate is determined to be 810 poise at 100 $sec^{-1}$ and 250 poise at 400 $sec^{-1}$.

Thermogravimetric Analysis (TGA)

TGA is run using a Du Pont 2100 thermal analyzer, a temperature scan range from 25° to 1000° C., a heating rate of 10° C./min, and a nitrogen purge. The residue remaining at 1000° C., also known as the char yield, is 38% for DHAMS polycarbonate. The significance of char yield and its relation to ignition resistance are discussed by Van Krevelen, *Properties of Polymers,* p. 731 (Third. Edition, 1990).

EXAMPLE 2

Injection Molding and Properties of DHAMS Polycarbonate

DHAMS polycarbonate, prepared according to the procedure of Example 1, is ground in a Thomas-Wiley model 4 laboratory mill, dried at 100° C. in a vacuum oven for 2 hours, and then injection molded using an Arburg injection molding machine. Standard 0.125 inch thick test specimens are injection molded at a barrel temperature of 300° C., a mold temperature of 125° C., and using 275 bars of injection pressure. Tensile strength at break (Tb), tensile modulus (TM), elongation at break (Eb), flexural strength (FS), and flexural modulus (FM) are determined according to American Society for Testing and Materials (ASTM) test method D-638. The notched Izod impact strength is determined according to ASTM D-256 wherein a 0.01 inch notch radius is employed. Vicat softening temperature for the polymer is determined according to ASTM D-1525 using a 1 kg load. The coefficient of linear thermal expansion (CLTE) in the flow direction is measured according to ASTM D-2236. Limiting oxygen index (LOI) is determined according to ASTM D-2863-87. UL-94 determinations of flammability resistance is conducted as specified by Underwriters Laboratories. Water absorption is measured at 25° C. after 24 hours immersion time. Specific gravity is measured according to ASTM D-570. These results are as follows: Specific Gravity—1.27; $H_2O$ Absorption (%)—0.002; LOI (% oxygen)—37; UL-94 Rating V-O; CLTE (ppm/°C.)—25–35; Vicat (°C.)—188; Tb (psi)—15,970; TM (psi) 575,800; Eb (%)—5; FS (psi)—18,970; FM (psi)—656,600; N. Izod (ft-lb/in)—8.8. The thermal resistance of DHAMS polycarbonate is also evaluated using a 0.025 inch diameter probe carrying a load of 10 g. Penetration of the sample is not observed until a temperature of 270° C. is reached.

EXAMPLE 3

Solid State Advancement of DHAMS Polycarbonate

A sample of DHAMS polycarbonate having an IV of 0.42 dL/g (measured in pentafluorophenol at 0.1g/dL and 45° C.) is synthesized by the general procedure of Example 1. DSC analysis shows a melting temperature of 231° C. and a crystallization temperature of 157° C., determined during the first heating and cooling cycles according to the procedure described above. The DHAMS polycarbonate is then solid state advanced with stirring at 220° C. under a reduced pressure of $2 \times 10^{-4}$ atmospheres for 48 hours, resulting in an increase in IV to 2.2 dL/g, a melting point at 271° C., and a crystallization temperature of 192° C.

EXAMPLE 4

Preparation of Mixture of DHAMS Polycarbonate and Glass Fibers

DHAMS polycarbonate (prepared as in Example 1) (417 g) is dry mixed with Owens-Corning glass fibers (125 g, 0.125 inch nominal length, #492). The mixture is then compounded using a Brabender conical twin screw extruder (counter-rotating) at 40 rpm screw speed, with the feed zone at 255° C. and all other zones at 300° C. The mixture is starve-fed to the extruder using a K-Tron volumetric screw, having a feeder setting at 10.0, venting under vacuum of any volatiles from the polymer melt, and a die is maintained. The measured torque is approximately 2,500 meter-gram and the head-pressure is less than 2,000 psi. As the mixture exits the die it is quenched with a water spray and cut into pellets with a conventional strand cutter. The resulting pellets are dried for approximately 16 hours in a vacuum oven set at 100° C. and then are injection molded into standard test specimens (as specified by ASTM D-638 for determining tensile properties) on an Arburg molding machine using a barrel temperature of 300° C., a mold temperature of 125° C., and 275 bars of injection pressure.

EXAMPLE 5

Preparation of a Mixture of DHAMS Polycarbonate and BA Polycarbonate

DHAMS polycarbonate with an IV of 1.5 dL/g (measured in pentafluorphenol at 0.1g/dL and 45° C.) and BA polycarbonate with a Condition 0 melt flow rate of 10 g/10 min are each separately cryogenically ground to a fine powder. A portion (0.5011 g) of the DHAMS polycarbonate and a portion (4.50 g) of the BA polycarbonate are combined and mixed. The resulting mixture (4.76 g) is added over an 8 minute period to the stirred reservoir of an injection molder which is preheated to 260° C. After addition of the mixture is complete, the stirred mixture is maintained for an additional 12 minutes at the 260° C. temperature prior to shutting off the stirring. The mixture is then injected into a 3 inch by 0.5 inch by 0.125 inch stainless steel mold which is preheated to 260° C.

The resulting molding is allowed to slowly cool to 23° C. before removing it from the molding machine. The molded specimen is opaque when it is removed. The flashing recovered from the edges of the injection molded mixture is examined by optical microscopy under crosspolarized light at both 75X and 300X magnifications. For the flashing, birefringent fibers are observed at both magnifications and are oriented in the flow direction in an isotropic matrix. A sample of the residual mixture remaining in the reservoir of the injection molder is removed and heated to 260° C. using a hot stage and then examined by optical microscopy under crosspolarized light. Birefringent fibers are observed at both magnifications and these fibers are randomly oriented in an isotropic matrix.

EXAMPLE 6

Preparation of DHAMS/BA Copolycarbonates Using Melt Transesterification

The copolymerization is run in a 250 mL, single-neck, round-bottom flask, fitted with a two neck adapter upon which are mounted a glass paddle stirrer and a 13 centimeter (cm) Vigreaux distillation column, distillation head with a thermometer, condenser and a receiver. DHAMS (0.11 moles, 24.19 grams), BA (0.012 moles, 2.71 grams) and diphenylcarbonate (0.12 moles, 25.46 grams) are added to the reaction flask. The apparatus is evacuated and refilled with nitrogen three times. The flask is immersed in a molten salt bath preheated to 220° C. When the solid reactants are melted to form a molten reaction mass, stirring is started and an aqueous solution of lithium hydroxide is added as a catalyst (0.36 mL, 0.06M).

The reaction temperature is raised to 265° C. over a period of one hour from atmospheric pressure to $2\times10^{-3}$ atmospheres. The latter pressure is maintained for 1 hour at 265° C. After an additional 5 minutes the reaction mass forms a ball on the stirrer shaft. The vacuum is then released under nitrogen and the reaction vessel is removed from the salt bath. The reaction apparatus is cooled and disassembled. The flask is broken away from an opaque chalk white copolycarbonate plug. The plug is sawed into chunks and then ground in a Wiley mill./ The copolycarbonate has an inherent viscosity of 0.91 dL/g which is measured at 45° C. using a solution of 0.1 g of polycarbonate in 100 mL of pentafluorophenol. The peak melting point is 250° C. on the first heating scan as measured by differential scanning calorimetry (DSC) on a sample run at 10° C./min. A second heating scan shows only a $T_g$ at 84° C. and no melting point transition is observed.

The copolycarbonate is characterized by optical microscopy under cross-polarized light. Observation of a bright field at temperatures above the melting point indicates that the copolycarbonate melt is optically anisotropic.

Additional copolycarbonates of DHAMS and BA are prepared according to the general procedure described above. These copolycarbonates are based on DHAMS/BA molar ratios of 90/10 to 50/50. The copolycarbonates are characterized by DSC for the determination of glass transition temperature (Tg) and melting temperature ($T_m$), IV, TGA (%char), and optical microscopy under cross-polarized light as described above. These results are shown in Table 1.

TABLE 1

| DHAMS/BA Molar Ratio | IV (dL/g) | Tg (°C.) | Tm (°C.) | TGA % Char | Nematic Melt |
|---|---|---|---|---|---|
| 90/10 | 0.91a | 84 | 250 | 35 | Yes |
| 75/25 | 0.36 | 105 | 216b | 31 | Yes |
| 70/30 | 0.59 | 124 | 213b | 31 | No |
| 65/35 | 0.38 | 130 | 210b | 30 | No |
| 60/40 | 0.59 | 134 | 218b | 30 | No |
| 50/50 | 0.31 | 137 | —c | 29 | No | aRun in pentafluorophenol at 45° C.
bAfter annealing 2–12 hr at 175° C. under nitrogen.
cNo melting transition observed.

EXAMPLE 7

Preparation of DHAMS/BA (50/50 and 25/75 Molar Ratio) Copolycarbonates Using Solution Process The following procedure is used to prepare a DHAMS/BA (50/50 molar ratio) copolycarbonate. A 2 L four-neck, round-bottom flask, equipped with a thermometer, condenser, phosgene/nitrogen inlet, and a paddle stirrer connected to a Cole Parmer servodyne is charged with DHAMS (26.80 g, 0.118 mol), BA (27.04 g, 0.118 mol), 4-tertbutylphenol (0.71 g, 4.7 mmol, a chain terminator), pyridine (48.5 g, 0.614 mol), and methylene chloride (0.5 L). The mixture is stirred at 250 rpm and slowly purged with nitrogen as phosgene (24.8 g, 0.251 mol) is bubbled in over 28 min while maintaining the reactor temperature at 17°–26° C. The reaction mixture is worked up by adding methanol (5 mL) and then a solution of 20 mL conc. HCl in 60 mL water.

After stirring for 15 minutes at 200 rpm, the mixture is poured into a 2 L separatory funnel. The methylene chloride layer is separated and washed further with a solution of 5 mL conc. HCl in 100 mL water, followed by 100 mL water, and then passed through a column (0.2 L bed volume) of macroporous cation-exchange resin. The product is isolated by adding the clear methylene chloride solution to a mixture of hexane (2 L) and acetone (0.2 L) in an explosion resistant blender. The product is filtered, dried in a hood overnight, and then dried for 48 hours in a vacuum oven at about 110° C. The dried product weighs 55.6 g and has an IV of 0.846 dL/g (determined in methylene chloride at 0.5 g/dL and 25° C.). DSC analysis (first scan, 20° C./min heating rate, scan from 50°–250° C.) shows an extrapolated onset glass transition temperature (Tg) of 144° C. The second scan shows a $T_g$ at 141° C. The $^1$H NMR spectrum of the product is in agreement with the target copolycarbonate composition. Size exclusion chromatography using narrow fraction polystyrene standards gives the following molecular weight analysis: $M_w$=98,446 and $M_w/M_n$=2.361.

The general procedure of this example is used to prepare additional DHAMS/BA copolycarbonates having DHAMS/BA molar ratios of 50/50 and 25/75.

Compression Molding and Properties of
DHAMS/BA Copolycarbonates

Compression molded plaques of approximately 6 inch×6 inch×0.125 inch are prepared at molding temperatures ,about 100° C. above $T_g$ using a Tetrahedron MTP-14 press. These transparent plaques are machined into test specimens. Tensile strength at yield (Ty), elongation at yield (Ey), and post-yield stress drop (PYSD) are determined according to ASTM D-638. A reduction in PYSD has been correlated with enhanced resistance to physical aging and fatigue, resulting in improved long term property maintenance: see R. Bubeck et al., *Polym. Eng. Sci.*, Vol. 24, p. 1142 (1984). IV, $T_g$, and notched Izod are determined as described above. These results are shown in Table 2.

TABLE 2

| DHAMS/BA Molar Ratio | IV (dL/g) | Tg (°C.) | N.Izod (ft-lb/in) | Ty (psi) | Ey (°C.) | PYSD (%) |
|---|---|---|---|---|---|---|
| 25/75 | 0.71 | 150 | 13.3 | 7,802 | 7.8 | 14.6 |
| 50/50 | 0.64 | 135 | 11.2 | 7,459 | 7.6 | 8.1 |
| 50/50 | 0.76 | 138 | 12.7 | 7,354 | 8.9 | 6.2 |

EXAMPLE 8

Preparation of DHAMS/BA (75/25 Molar Ratio) Copolycarbonate Using Solution Process The same equipment as described in Example 7 is charged with DHAMS (40.30 g, 0.178 mol), BA (13.55 g, 0.059 mol), 4-tertbutylphenol (0.71 g, 4.7 mmol), pyridine (48.7 g, 0.616 mol), and methylene chloride (0.5 L). The mixture is stirred at 250 rpm and slowly purged with nitrogen as phosgene (24.4 g, 0.247 mol) is bubbled in over 21 minutes while maintaining the reactor temperature at 18°–26° C. The product begins to precipitate from the reaction solution when 13 g of phosgene is added. The same workup procedure as shown in Example 7 is followed, except that the product is not passed through a column of ion exchange resin. For this composition the product is a slurry in methylene chloride rather than a solution.

The product is isolated by adding the slurry to 3 L of methanol in an explosion resistant blender. The product is filtered, dried in a hood overnight, and then dried for 48 hours in a vacuum oven at about 110° C. The product weighed 59.6 g and is insoluble in the following solvents that dissolve BA polycarbonate: methylene chloride, chloroform, tetrahydrofuran, dimethylformamide, and sym-tetrachloroethane. A compression molded plaque (approximately 0.02 inch thickness) prepared at 250° C. (3 min molding time, 10,000 pounds platen pressure) is well-fused, opaque, creasable, insoluble in the solvents listed above, and does not stress crack when flexed and exposed to acetone. DSC analysis of the product shows a first scan $T_g$ of 135° C. and a melting endotherm from about 175°–220° C. with a transition peak at 194° C. A sample of this copolycarbonate is characterized by optical microscopy under crosspolarized light as described above. The sample is applied between a glass slide and a glass coverslip and then placed on the programmable hot stage of the microscope. A heating rate of 10° C./min is employed and the following results are obtained:

| Temperature (°C.) | Observations |
|---|---|
| 30 | birefringent crystalline solid |
| 145 | slight softening observed when compressed between coverslip and slide |
| 168 | fuses to highly birefringent, opaque, viscous fluid as compressed |
| 184 | highly birefringent, viscous fluid |
| 200 | highly birefringent, viscous fluid, stir opalescent, nematic texture, orients with shear to give flow directed domains |
| 245 | some isotropic fluid observed |
| 285 | isotropic fluid containing scattered birefringent regions |
| 291 | isotropization complete |

EXAMPLE 9

Preparation of DHAMS/9,9-Bis(4-hydroxyphenyl)fluorene (BHPF) Copolycarbonate

The general procedure of Example 7 is used to prepare DHAMS/BHPF (75/25 molar ratio) copolycarbonate. The resulting copolycarbonate is insoluble in methylene chloride. DSC analysis shows a $T_g$ at 173° C. (first scan, 20° C./min heating rate).

EXAMPLE 10

Preparation of Polyestercarbonate from DHAMS, Diphenyl Terephthalate, and Diphenyl Carbonate The polymerization is run in a 250 mL single-neck, round-bottom flask, fitted with a two-neck adapter upon which are mounted a glass paddle stirrer and a 13 cm Vigreaux distillation column, distillation head with a thermometer, condenser and a receiver. Diphenyl terephthalate (0.0143 mol, 3.64 g, an ester derivative of terphthalic acid), DHAMS (0.11 mol, 25.84 g), and diphenyl carbonate (0.10 mol, 22.02 g) is added to the reaction flask. The apparatus is evacuated and refilled with nitrogen three times. The flask is immersed in a molten salt bath preheated to 220° C. When the solid reactants have melted to form a molten reaction mass, stirring is started and lithium hydroxide (0.36 mL of 0.06M aqueous solution) is added.

The reaction temperature is raised to 265° C. over a period of one hour and the pressure is reduced from atmospheric pressure to $2 \times 10^{-3}$ atmospheres. The latter pressure is maintained for 1 hour at 265° C. After an additional 5 minutes the reaction mass forms a ball on the stirrer shaft. The vacuum is then released under nitrogen and the reaction vessel is removed from the salt bath. The reaction apparatus is cooled and disassembled. The volume of phenol recovered is 20.1 mL. The flask is broken away from an opaque chalk-white product. The plug is sawed into chunks and then ground in a Wiley mill. The polyestercarbonate has an inherent viscosity of 1.05 dL/g (pentafluorphenol, 45° C. 0.1 g/dL). DSC analysis, conducted at a scan rate of 10° C./min, shows a melting transition at 213° C.

EXAMPLE 11

Preparation of Polyester from 4,4'-Diacetoxy-alpha-methylstilbene (DAAMS) and Terephthalic Acid The following procedure is used to convert DHAMS to DAAMS. To a single-neck, 500 mL, round-bottom flask, equipped with a condenser and nitrogen inlet, are added DHAMS (0.133 mol, 30 g) and acetyl chloride (0.665 mol, 48 mL) in methylene chloride (200 mL). The reaction mixture is refluxed for 3 hours and a clear solution is obtained, at which point by High Pressure Liquid Chromatography (HPLC) analysis the reaction has reached completion. The reaction mixture is cooled, and then concentrated to remove excess methylene chloride and unreacted acetyl chloride, leaving a white powder as the product. The crude product is recrystallized from methyl isobutyl ketone, resulting in 20.16 g of DAAMS as a white crystalline solid having a melting point of 126° C.

The polymerization is run in a 250 mL single-neck, round-bottom flask, fitted with a two neck adapter upon which are mounted a glass paddle stirrer and a 13 cm Vigreaux distillation column, distillation head with a thermometer, condenser and a receiver. Terephthalic acid (0.084 mol, 13.99 g) and DAAMS (0.084 mol, 26.12 g) are added to the reaction flask. The apparatus is evacuated and refilled with nitrogen three times. The flask is then immersed in a molten salt bath preheated to 260° C. The white suspension becomes a slurry over the next 2 hours as the temperature is slowly raised to 360° C. The pressure is slowly lowered to $2 \times 10^{-3}$ atmospheres. After an additional 30 minutes, the apparatus is cooled, and the vacuum is released under nitrogen. The isolated amount of opaque, pale yellow polyester is 26 g. The receiver contains 9.7 mL of acetic acid. The polyester is ground to a powder and is found to be insoluble in pentaflurophenol at 0.1 g/dL and 45° C. DSC analysis of the polymer results in no observable endotherms or exotherms in the analysis range of 25°–400° C.

EXAMPLE 12

Preparation of Copolyester from DAAMS, Isophthalic Acid, 4-Acetoxybenzoic Acid (ABA), and 2,6-Naphthalenedicarboxylic Acid (NDCA)

The polymerization is run in a 250 mL single-neck, round-bottom flask, fitted with a two neck adapter upon which are mounted a glass paddle stirrer and a 13 cm Vigreaux distillation column, distillation head with a thermometer, condenser and a receiver. ABA (0.102 mol, 18,232 g), isophthalic acid (0.0169 mol, 2.80 g), NDCA (0.017 mol, 3.65 g), and DAAMS (0.034 mol, 10.46 g) are added to the reaction flask. The apparatus is evacuated and refilled with nitrogen three times. The flask is immersed in a molten salt bath preheated to 260° C. When the solid reactant melt to form a molten reaction mass, stirring is started and lithium hydroxide (0.36 mL of 0.06M aqueous solution) is added. The reaction temperature is raised to 340° C. over a period of 2 hours at atmospheric pressure. Then the pressure is lowered to $2 \times 10^{-3}$ atmospheres and this pressure is maintained for an additional hour at 340° C. After an additional 5 minutes, the reaction mass forms a ball on the stirrer shaft. The vacuum is then released under nitrogen and the reaction vessel is removed from the salt bath. The reaction apparatus is cooled and disassembled. The volume of acetic acid recovered is 9.67 mL. The flask is broken away from the opaque yellow copolyester plug. The plug is sawed into chunks and then ground in a Wiley mill. DSC analysis, conducted at a scan rate of 10° C./min, showed a melting transition at 280° C.

EXAMPLE 13

Preparation of Polycarbonate of 4,4'-Dihydroxy-alpha,alpha'-diethylstilbene (DES)

This polycarbonate is prepared according to the general procedure of Example 1 using DES (0.14 mol, 36.5 g) and diphenyl carbonate (0.15 mol, 32.1 g). During the synthesis, conducted from 220° to 290° C. the reaction mixture remains isotropic. Phenol (25 g) is removed as a distillate during the synthesis. The isolated yield of DES polycarbonate is 37 g. This polycarbonate has an IV of 0.37 dL/g (determined in chloroform at 25° C.). DSC analysis shows a $T_g$ at 87° C. and no indications of a melting transition in the scan range of 25° to 300° C. The polycarbonate is annealed at 125° C. for 12 hours under an atmosphere of nitrogen. DSC analysis of the annealed sample shows a $T_g$ at 92° C., but no evidence of melting transitions.

EXAMPLE 14

Preparation of DHAMS/DES (90/10 Molar Ratio) Copolycarbonate

This copolycarbonate is prepared according to the general procedure of Example 1 using DES (0.016 mol, 4.19 g), DHAMS (0.14 mol, 31.76 g), and diphenyl carbonate (0.16 mol, 33.41 g). During the synthesis, conducted from 220° to 290° C., the reaction changes from an isotropic liquid to an opaque molten state at 270° C. Phenol (29 g) is removed as distillate during the synthesis. The resulting copolycarbonate is obtained as a white crystalline solid in an isolated yield of 35 g. DSC analysis shows a $T_g$ at 87° C. and a melting transition at 237° C. during the heating scan and a crystallization exotherm at 112° C. during the cooling scan. The polymer is insoluble in methylene chloride and chloroform at 0.1 g/dL. The polymer melt is optically anisotropic as determined by optical microscopy analysis described above.

EXAMPLE 15

Preparation of DHAMS/4,4'-Dihydroxystilbene (DHS) Copolycarbonate

DHAMS/DHS (90/10 molar ratio) copolycarbonate is prepared according to the general procedure of Example 1 using DHS (0.02 mol, 3.35 g), DHAMS (0.14 mol, 32.5 g), and diphenyl carbonate (0.16 mol, 34.2 g). DHS is prepared according to the procedure of McMurry and Silvestri, *J. Org. Chem.*, Vol. 40, p. 2687 (1975). The polymerization is conducted from 220° to 290° C. The reaction mixture becomes opaque at 280° C. Phenol (30 g) is removed as a distillate during the synthesis. The resulting copolycarbonate, 37 g, is isolated as a white fibrous solid. The polymer is insoluble in methylene chloride or chloroform at 0.1 g/dL. DSC analysis shows a sharp melting transition at 283° C. and a crystallization exotherm at 200° C. during the first heating and cooling scans. The second heating and cooling scans of the sample show a melting transition at 283° C. and a crystallization exotherm at 196° C. The melt is optically anisotropic as determined by the methods described above.

EXAMPLE 16

Preparation of DHAMS/DHS (75/25 Molar Ratio) Copolycarbonate

This copolycarbonate is prepared according to the general procedure of Example 1 using DHS (0.04 mol, 8.45 g), DHAMS (0.121 mol, 27.3 g), and diphenyl carbonate (0.16 mol, 34.5 g). The reaction is conducted from 220° to 320° C. and the reaction mixture becomes opaque at 285° C. Phenol (30 g) is removed as a distillate during the synthesis. The resulting copolycarbonate, 35 g, is isolated as a white fibrous solid. The polymer is insoluble in methylene chloride or chloroform at 0.1 g/dL. DSC analysis shows a sharp melting transition at 299° C. and a crystallization exotherm at 228° C. The melt is optically anisotropic as determined by the methods described above.

What is claimed is:

1. A polycarbonate, polyester, or polyestercarbonate composition prepared from at least one diol and at least one carbonate precursor or $C_{8-40}$ carboxylic acid, wherein
   (a) at least about 95 mole percent of the carbonate precursor or carboxylic acid is selected from the group consisting of
      (i) dialkyl carbonates, diarylcarbonates, carbonyl halides, and bis(trihaloalkyl) carbonates; and
      (ii) aromatic dicarboxylic acids, hydroxybenzoic acids, hydroxynaphthoic acids, hydroxybiphenyl acids, hydroxycinnamic acids, and the halides or metal salts of such acids; and
   (b) at least about 95 mole percent of the diol from which the composition is prepared consists of one or more aromatic diols, at least about 10 mole percent of which consists of one or more stilbene diols selected from the group consisting of: 4,4'-dihydroxy-alpha-methylstilbene; 4,4'-dihydroxy-alpha,alpha'-diethylstilbene; and 4,4'dihydroxy-alpha,alpha'-dimethylstilbene.

2. The composition of claim 1 comprising repeat units of the formula:

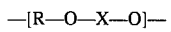

wherein R independently in each occurrence is the divalent nucleus of an aromatic diol, X is selected from

or a mixture thereof, $R^1$ independently in each occurrence is the divalent nucleus of a difunctional aromatic carboxylic acid.

3. The composition of claim 2 which additionally comprises at least one repeat unit of the formula: —[$R^2$—C(O)—O]—, wherein $R^2$ is the divalent nucleus of an aromatic hydroxycarboxylic acid.

4. The composition of claim 1 which comprises at least one polycarbonate.

5. The composition of claim 1 which comprises at least one polyester.

6. The composition of claim 1 which comprises at least one polyestercarbonate.

7. The composition of claim 1 which comprises at least one thermotropic liquid crystalline polymer.

8. The composition of claim 1 which is prepared from more than one diol, including at least one aromatic diol which is not a stilbene diol.

9. The composition of claim 1 which is prepared from more than one diol, including 9,9-bis(4-hydroxyphenyl)fluorene, hydroquinone, 4,4'-dihydroxybiphenyl, or 4,4'-thiodiphenol.

10. The composition of claim 1 which is prepared from more than one diol, including bisphenol A.

11. A polyester or polyestercarbonate composition prepared from at least one diol and at least one $C_{8-40}$ carboxylic acid, wherein at least 95 mole percent of the carboxylic acid is selected from the group consisting of: terephthalic acid, isophthalic acid, 2,6-naphthalenedicarboxylic acid, 4,4'-biphenyldicarboxylic acid, 4,4'-stilbenedicarboxylic acid, and 4,4'-terphenyldicarboxylic acid; and wherein at least about 95 mole percent of the diol from which the composition is prepared consists of one or more aromatic diols, at least about 10 mole percent of which consists of one or more stilbene diols selected from the group consisting of: 4,4'-dihydroxy-alpha-methylstilbene; 4,4'-dihydroxy-alpha,alpha'-diethylstilbene; and 4,4'-dihydroxy-alpha,alpha'-dimethylstilbene.

12. The composition of claim 3 wherein at least a portion of the carboxylic acid is 4-hydroxybenzoic acid, 3-hydroxybenzoic acid, or 6-hydroxy-2-naphthoic acid.

13. The composition of claim 1 wherein at least about 98 mole percent of the diols from which the composition is prepared are aromatic diols.

14. The composition of claim 13 wherein 100 mole percent of the diols from which the composition is prepared are aromatic diols.

15. The composition of claim 1 wherein at least about 25 mole percent of the aromatic diols from which the composition is prepared are stilbene diols.

16. The composition of claim 1 wherein at least about 50 mole percent of the aromatic diols from which the composition is prepared are stilbene diols.

17. The composition of claim 16 wherein 100 mole percent of the aromatic diols from which the composition is prepared are stilbene diols.

18. The composition of claim 1 wherein the polymers therein have a weight average molecular weight of at least about 10,000.

19. The composition of claim 7 wherein the difference between the clearing temperature and melt temperature is at least about 50° C.

20. The composition of claim 7 which has a melt temperature of at least about 200° C.

21. A composition comprising at least one percent by weight of the polycarbonate, polyester, or polyestercarbonate composition of claim 1 and at least one percent by weight of a different thermoplastic polymer.

22. A molded or extruded article comprising the compositions of claim 1.

23. The composition of claim 1 wherein at least about 95 mole percent of the carbonate precursor or carboxylic acid present in the reaction mixture is diphenyl carbonate.

* * * * *